United States Patent
Jang

(10) Patent No.: US 6,275,631 B1
(45) Date of Patent: Aug. 14, 2001

(54) APPARATUS FOR MANUFACTURING LONG-PERIOD OPTICAL FIBER GRATING

(75) Inventor: Joo-nyung Jang, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,055

(22) Filed: Oct. 13, 1999

(30) Foreign Application Priority Data

Oct. 13, 1998 (KR) .................................................. 98-42712

(51) Int. Cl.$^7$ ................................ G02B 6/34; G03C 5/00; G01N 21/43

(52) U.S. Cl. ................................ 385/37; 385/31; 385/33; 385/123; 430/56; 430/290; 65/385; 65/485

(58) Field of Search .................................. 385/1, 4, 5, 31, 385/33, 37, 39, 123; 430/54, 56, 290; 65/385, 425, 483, 485; 359/237, 238

(56) References Cited

U.S. PATENT DOCUMENTS

| | | | |
|---|---|---|---|
| 5,388,173 | * 2/1995 | Glenn | 385/37 |
| 5,619,603 | * 4/1997 | Epworth et al. | 385/37 |
| 5,620,496 | 4/1997 | Erdogan et al. | 65/425 |
| 5,652,818 | * 7/1997 | Byron | 385/37 |
| 5,694,502 | * 12/1997 | Byron | 385/37 |
| 5,745,615 | * 4/1998 | Atkins et al. | 385/37 |
| 5,787,213 | 7/1998 | Brownlow | 385/37 |
| 5,881,188 | 3/1999 | Starodubox | 385/37 |
| 5,898,804 | 4/1999 | Wickham | 385/37 |
| 5,912,999 | 6/1999 | Brennan, III et al. | 385/37 |
| 5,951,881 | 9/1999 | Rogers et al. | 216/41 |
| 5,956,442 | 9/1999 | Byron | 385/37 |
| 6,081,640 | * 6/2000 | Ouellette et al. | 385/37 |
| 6,201,911 | * 3/2001 | Jang | 385/37 |
| 6,204,969 | * 3/2001 | Jang | 385/37 X |

FOREIGN PATENT DOCUMENTS 9-288204  11/1997  (JP) .................................... 385/37 X

OTHER PUBLICATIONS

Korean Industrial Property Office Action, dated Sep. 29, 2000.

* cited by examiner

Primary Examiner—Brian Healy
(74) Attorney, Agent, or Firm—Robert E. Bushnell, Esq.

(57) ABSTRACT

An apparatus for fabricating a long-period fiber grating, including a laser source, a first lens for adjusting the focal point of laser generated by the laser source, a dispersing portion for dispersing laser passed through the first lens so that the size of a beam of the laser is broadened, a second lens for collimating the dispersed laser, and a composite amplitude mask for periodically transmitting laser collimated by the second lens, to an optical fiber, wherein the refractive index of the core of the optical fiber is periodically changed by laser which has passed through the composite amplitude mask. The coupling bandwidth of a long-period fiber grating can be controlled by adjusting the size of a laser beam which reaches an optical fiber. The wavelength where coupling occurs is controlled by adjusting the rotation angle of two amplitude masks, so that a desired light transmission spectrum is easily created.

20 Claims, 5 Drawing Sheets

APPARATUS FOR MANUFACTURING LONG-PERIOD OPTICAL FIBER GRATING

CLAIM OF PRIORITY

This application makes reference to, incorporates the same herein, and claims all benefits accruing under 35 U.S.C. §119 from an application entitled APPARATUS FOR FABRICATING LONG-PERIOD GRATING FILTER earlier filed in the Korean Industrial Property Office on the 13$^{th}$ day of October 1999, and there duly assigned Ser. No. 42712/1998, a copy of which is annexed hereto.

BACKGROUND OF THE INVENTION

1. Technical Field

The present invention relates to an apparatus for manufacturing a long-period optical fiber grating.

2. Related Art

An optical fiber communication system consists of an information source, a transmitter or modulator, a transmission medium, and a receiver or demodulator at a destination point. The information source provides an electrical signal to the transmitter. The transmitter comprises an electrical stage which drives an optical source to give modulation of the light-wave carrier. The optical source which provides the electrical-optical conversion may be a semiconductor laser. The transmission medium consists of an optical fiber cable. The receiver consists of an optical detector which drives a further electrical stage and hence provides demodulation of the optical carrier. Thus there is a requirement for electrical interfacing at either end of the optical link. Fiber optic communications offer major advantages over wire systems because of low attenuation and high bandwidth available.

An optical fiber cable is an optical fiber waveguide having a core of a first refractive index $n_1$ surrounded by a transparent cladding of slightly lower refractive index $n_2$. The cladding supports the waveguide structure while also substantially reducing radiation loss into surrounding air. The optical fiber cable corresponds to a single cylindrical glass fiber having a diameter comparable to the diameter of a human hair. The optical fiber cable acts as an open optical waveguide. Light which is launched into an optical fiber at an angle less than an acceptance angle demonstrate total internal reflection in the core of the optical fiber. Periodic structures maybe incorporated into planar waveguides to form integrated optical filters. An optical filter can be used to guide light to the core of an optical fiber causing the light to propagate in the core of that optical fiber.

One type of optical filter is a long period grating filter. I have found that there is a need for an improved apparatus for manufacturing long-period optical fiber grating. Efforts have been made to improve optical fiber-related components.

Exemplars of recent efforts in the art include U.S. Pat. No. 5,596,442 for BRAGG REFLECTION GRATINGS IN OPTICAL FIBERS issued to Byron, U.S. Pat. No. 5,951,881 for FABRICATION OF SMALL-SCALE CYLINDRICAL ARTICLES issued to Rogers, et al., U.S. Pat. No. 5,912,999 for method for FABRICATION OF IN-LINE OPTICAL WAVEGUIDE INDEX GRATING OF ANY LENGTH issued to Brennan, III, et al., U.S. Pat. No. 5,898,804 for OPTICAL FIBER HAVING CORE SEGMENT WITH REFRACTIVE-INDEX GRATING issued to Wickham, U.S. Pat. No. 5,881,188 for OPTICAL FIBER HAVING CORE SEGMENT WITH REFRACTIVE-INDEX GRATING issued to Starodubov, U.S. Pat. No. 5,787,213 for METHOD AND APPARATUS FOR WRITING BRAGG GRATINGS ON STRAINED OPTICAL FIBERS issued to Brownlow, and U.S. Pat. No. 5,620,496 for METHOD OF MAKING STABLE OPTICAL DEVICES EMPLOYING RADIATION-INDUCED INDEX CHANGES issued to Erdogan, et al.

While these recent efforts provide advantages, I note that they fail to adequately provide an improved apparatus for efficiently and conveniently manufacturing long-period optical fiber grating.

SUMMARY OF THE INVENTION

An objective of the present invention is to provide an apparatus for fabricating along-period fiber grating, by which the period of a long-period fiber grating is controlled by adjusting the size of a laser beam by including a dispersing portion for dispersing incident light, a cylindrical lens for collimating dispersed light, and a composite amplitude mask having a controllable period.

Another objective is to provide an improved apparatus for efficiently and conveniently manufacturing long-period optical fiber grating. Accordingly, to achieve the above objectives and others, the present invention provides an apparatus for manufacturing a long-period fiber grating, the apparatus including: a laser source; a first lens for adjusting the focal point of laser generated by the laser source; a dispersing portion for dispersing laser passed through the first lens so that the size of a beam of the laser is broadened; a second lens for collimating the dispersed laser; and a composite amplitude mask for periodically transmitting laser collimated by the second lens, to an optical fiber, wherein the refractive index of the core of the optical fiber is periodically changed by laser which has passed through the composite amplitude mask.

To achieve the above objectives and others, the present invention also provides an apparatus for manufacturing a long-period fiber grating, including: a laser source; a first lens for adjusting the focal point of laser generated by the laser source; a dispersing portion for dispersing laser passed through the first lens so that the size of a beam of the laser is broadened; a second lens for collimating the dispersed laser; a composite amplitude mask for transmitting laser collimated by the second lens, to an optical fiber in the period of a transmission area; a measuring unit for measuring the coupling peak of a long-period fiber grating formed on the optical fiber by laser which has passed through the composite amplitude mask; and a control unit for controlling the rotation angle of the composite amplitude mask so that a measured coupling peak occurs at a desired wavelength, wherein the period of the transmission area of the composite amplitude mask is determined by rotating two amplitude masks, each formed by alternating transmission areas for transmitting the laser with non-transmission areas through which the laser is not passed, by a predetermined angle in opposite directions.

To achieve these and other objects in accordance with the principles of the present invention, as embodied and broadly described, the present invention provides an apparatus for manufacturing a long-period fiber grating, comprising: a laser unit emitting laser light; a first lens adjusting the focal point of the laser light generated by said laser unit; a dispersing portion dispersing the laser light passed through said first lens and broadening a beam of the laser light; a second lens collimating the dispersed laser light; and a composite amplitude mask periodically transmitting to an optical fiber the laser light collimated by said second lens, the optical fiber having a refractive index of a core of the optical fiber periodically changed by the laser light which has passed through said composite amplitude mask.

To achieve these and other objects in accordance with the principles of the present invention, as embodied and broadly described, the present invention provides an apparatus for manufacturing a long-period fiber grating, comprising: a laser source outputting laser light; a first lens adjusting a focal point of the laser light output by said laser source; a dispersing unit dispersing the laser light passed through said first lens and broadening a beam of the laser light; a second lens collimating the dispersed laser light; a composite amplitude mask having a transmission area transmitting the laser light collimated by said second lens, said composite amplitude mask transmitting the laser light to an optical fiber in a period of said transmission area; a measuring unit measuring a coupling peak of said long-period fiber grating formed on the optical fiber by the laser light transmitted through said composite amplitude mask; and a control unit controlling a rotation angle of said composite amplitude mask to cause said measured coupling peak to occur at a desired wavelength.

To achieve these and other objects in accordance with the principles of the present invention, as embodied and broadly described, the present invention provides an apparatus, comprising: a laser unit emitting laser light; a composite amplitude mask periodically transmitting the laser light to an optical fiber, the optical fiber having a refractive index of a core of the optical fiber periodically changed by the laser light which has passed through said composite amplitude mask; and said composite amplitude mask further comprising two amplitude masks, each of said two amplitude masks having a transmission area transmitting the laser light and a non-transmission area not transmitting the laser light, each of said two amplitude masks being equally rotated at a same angle in opposite directions to adjust a period of said composite amplitude mask.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENT

Figure 1:
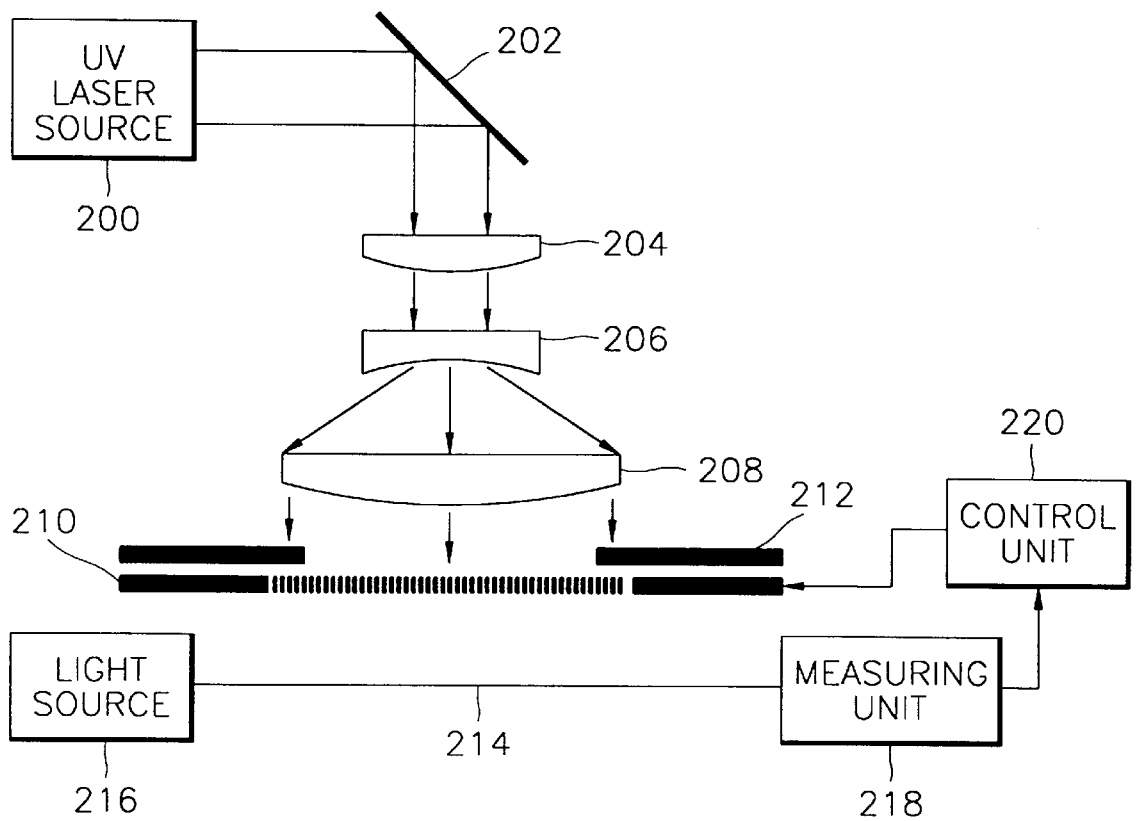
FIG. 1 is a block diagram illustrating the configuration of a long-period fiber grating fabricating apparatus, in accordance with the principles of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A long period grating filter can be manufactured by periodically changing the refractive index of the core of an optical fiber which is sensitive to ultraviolet (UV) rays. Typical long-period optical fiber gratings, elements for coupling a core mode in which light travels through the core of an optical fiber, to a cladding mode, are well suited to gain flattening of an erbium doped fiber amplifier (EDFA). The long-period optical fiber grating is formed by periodically changing the refractive index of the core of an optical fiber which is sensitive to ultraviolet rays (UV). That is, the refractive indices of portions of the optical fiber exposed to ultraviolet increases, and the refractive indices of portions not exposed to ultraviolet does not change, so that the refractive index of the optical fiber is periodically changed. The conditions of coupling light which travels through the core of an optical fiber are expressed in the following Equation 1:

$$\beta_{co} - \beta_{cl}^n = \frac{2\pi}{\Lambda} \quad (1)$$

wherein $\beta_{co}$ is the propagation constant of a core mode, $\beta_{cl}^n$ is the propagation constant of an n-th cladding mode, and $\Lambda$ denotes a grating period.

In Equation 1, when $2\pi n/\Lambda$ (here, n denotes a refractive index) is substituted for $\beta$, the refractive index difference between the core mode and the cladding mode $(n_{co} - n_{cl})$ becomes $\lambda/\Lambda$. Thus, the period $\Lambda$ and the refractive index difference $(n_{co} - n_{cl})$ must be determined to couple a certain wavelength to a cladding mode. The refractive index difference can be obtained by appropriately irradiating an ultraviolet laser on an optical fiber which is sensitive to ultraviolet.

In the process for fabricating a long-period fiber grating, first, a laser passes through a cylindrical lens and is projected onto an optical fiber which is in contact with an amplitude mask. The amplitude mask has a structure in which an area through which a laser passes alternates with an area through which no laser passes. The refractive index of the core of the optical fiber is periodically changed by the laser which passes through the amplitude mask, whereby a long-period fiber grating is formed.

Here, it is important for the amplitude mask to have an accurate period. The amplitude mask can have an accurate period by using several methods. One method among them is irradiating a laser after mounting a single slit on a translation stage and moving the slit or optical fiber by a desired period.

This method has advantages in that an accurate period can be obtained, and the period can be controlled. However, this method has disadvantages in that when the period is changed, the duty cycle, representing the ratio between an area through which light passes and an area through which no light passes, is not constant since the width of the slit is fixed. Also, this method is time-consuming since refractive index change is made on a point-by-point basis, and a large beam of laser may not be used effectively. Furthermore, an expensive translation stage is required.

The period of the mask can also be made accurate by a method of fabricating a mask by making a pattern on silica and then doping the pattern with chrome. A mask having an accurate period can be fabricated by this method, but a mask fabricating process is complicated and requires much cost. Since the period is fixed, one mask can design only one light transmission spectrum. In this case, damage threshold power is low, so that an excimer laser having high output power cannot be effectively used.

Alternatively, the period of the mask can be made accurate by a method of using multiple slits. This is a method of simultaneously irradiating a laser to the entire portion where a grating is formed. In this method, a process for preparing a mask is simple, and requires a small amount of cost. However, an error of ±5 micrometers ($\mu$m) is generated while laser is being processed, so that precise spectrum designing is difficult. Similar to the previous methods, the period is also fixed in this method, so that the number of spectrums that can be designed is limited.

Referring to FIG. 1, a long-period fiber grating fabricating apparatus according to the present invention includes an ultraviolet (UV) laser source 200, a mirror 202, a first cylindrical lens 204, a dispersing portion 206, a second cylindrical lens 208, a composite amplitude mask 210, a slit 212, an optical fiber 214, a light source 216, a measuring unit 218, and a control unit 220.

The mirror 202 reflects ultraviolet laser generated by the ultraviolet laser source 200 and changes the path of the ultraviolet laser. The first cylindrical lens 204 controls the focal point of laser whose path has been changed by the mirror 202. The dispersing portion 206 disperses laser whose focal point has been adjusted by the first cylindrical lens 204. The second cylindrical lens 208 collimates laser passed through the dispersing portion 206. The composite amplitude mask 210 selectively passes laser passed through the second cylindrical lens 208. The slit 212 causes laser which has passed through the composite amplitude mask 210 to irradiate only to a portion where a long-period fiber grating is to be formed. Laser which has passed through the slit 212 is irradiated to the optical fiber 214. The measuring unit 218 measures the characteristics of light passed through the optical fiber 214. The control unit 220 controls the period of the composite amplitude mask 210 according to a coupling peak measured by the measuring unit 218.

Here, the coupling peak means that the extinction ratio is maximized by coupling a core mode of each wavelength to a cladding mode in a long-period fiber grating.

In the operation of the apparatus having such a configuration, the mirror 202 reflects incident laser generated by the ultraviolet laser source 200 by 90° and changes the path for the laser. The first cylindrical lens 204 adjusts the focal point of the laser, such that the focal point lands on the optical fiber 214.

The dispersing portion 206 disperses laser which has passed through the first cylindrical lens 204 to enlarge the size of a laser beam. It is preferable that a concave lens is used as the dispersing portion 206. If the laser beam of an excimer laser is a rectangular type, its maximum size is 10×30 millimeters (mm). In practice, a laser beam of uniform intensity having a length of about 20 millimeters (mm) can be used to fabricate a grating. Thus, the size of a beam must be extended to adjust the length of the grating.

The second cylindrical lens 208 collimates the dispersed light. The focal point of the second cylindrical lens 208 must be consistent with that of the dispersing portion 206 to collimate the dispersed light. Here, the length of the second cylindrical lens 208 must be the same length as that of a long-period fiber grating to be manufactured.

The composite amplitude mask 210 selectively transmits light incident in parallel from the second cylindrical lens 208. The slit 212 has a width as large as the length of a grating, the width determining the bandwidth of the long-period fiber grating. When light which has passed through the slit 210 and the composite amplitude mask 210 is irradiated to the optical fiber 214, the measuring unit 218 measures the coupling peak according to the wavelength of light generated by the light source 216 and passed through the optical fiber 214. Here, the optical fiber 214 is preferably an ultraviolet photosensitive fiber.

The control unit 220 controls the coupling peak wavelength and the extinction ratio by adjusting the rotation angle of the composite amplitude mask 210 so that the long-period fiber grating is coupled at a predetermined wavelength according to the measured coupling peak.

Figure 2A:
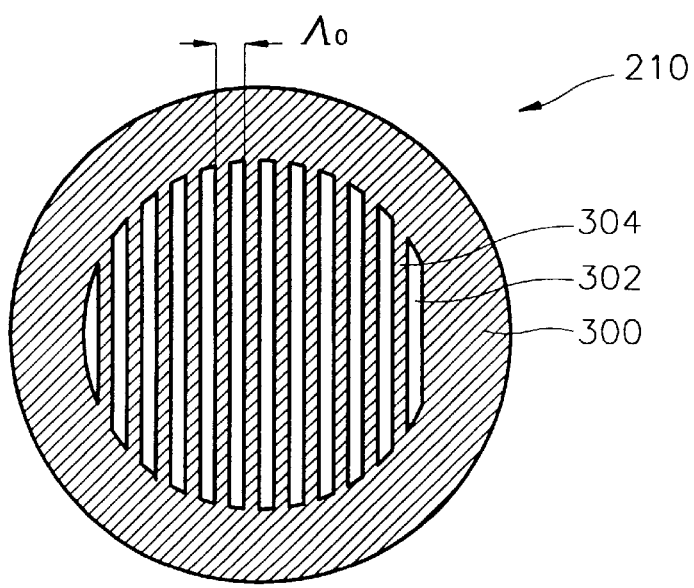
FIG. 2A shows the components of the composite amplitude mask of FIG. 1, in accordance with the principles of the present invention.
Figure 2B:
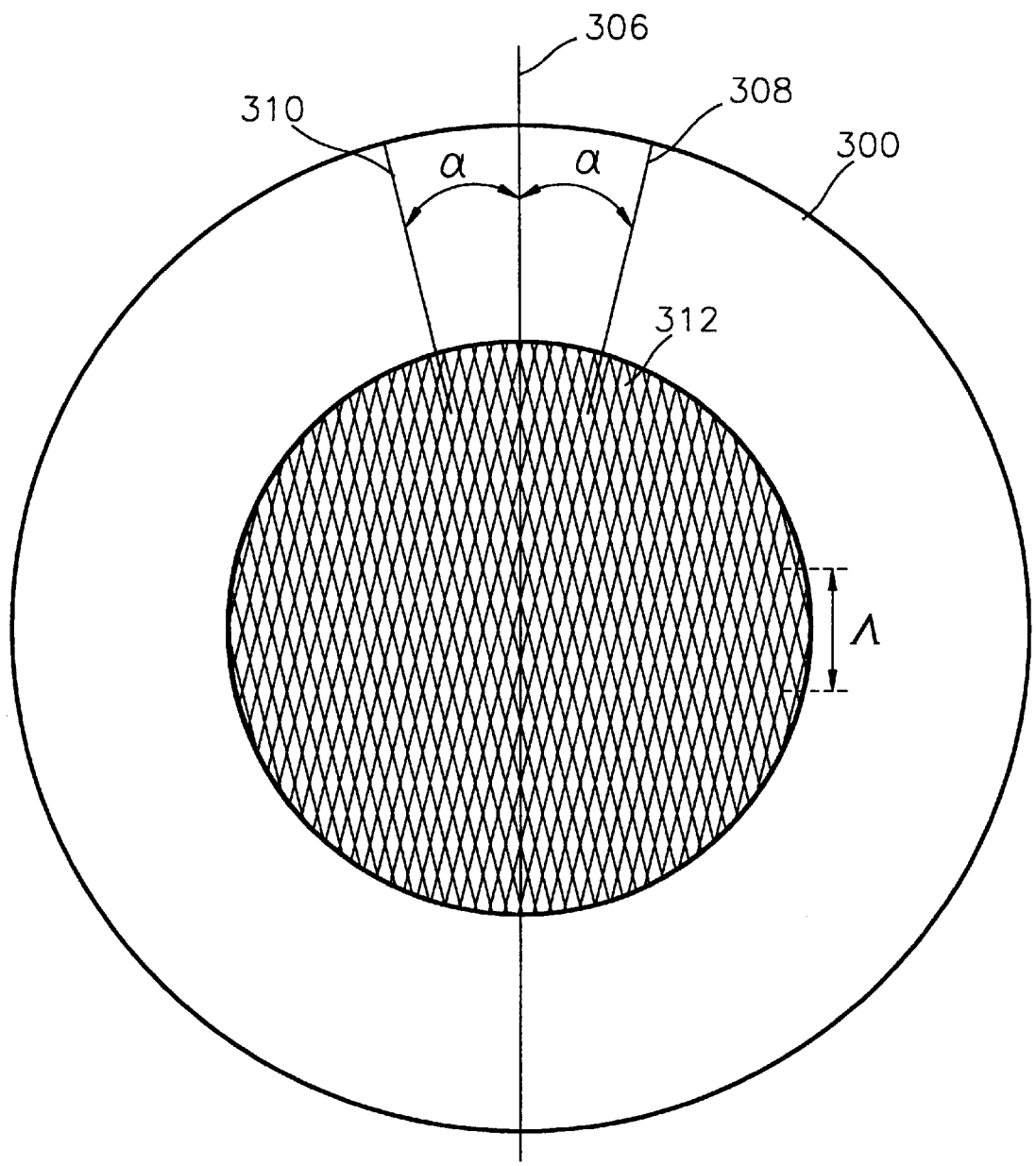
FIG. 2B shows a composite amplitude mask.

FIG. 2A shows an element forming the composite amplitude mask 210 of FIG. 1. FIG. 2B a shows a composite amplitude mask which is used in the present invention. In FIG. 2B, two amplitude masks shown in FIG. 2A are put one upon another and rotated by a predetermined angle in opposite directions. The amplitude mask of FIG. 2A is a metal substrate 300 having a thickness of about 0.2 millimeters (mm), constituted by transmission areas 302 for passing light at a period $\Lambda_0$ of between 100 micrometers ($\mu$m) and 999 micrometers ($\mu$m), and non-transmission areas 304. For example, the metal substrate 300 is a stainless steel substrate. The transmission areas 302 are processed by using carbon dioxide laser, by chemical etching or by other methods. The use of the metal substrate 300 removes a restriction due to a damage threshold power, so that high-power ultraviolet laser can be used as a source. The transmission areas 302 transmit laser, whereby the refractive index of an optical waveguide is increased. The non-transmission areas 304, a metal portion, block ultraviolet laser.

The composite amplitude mask of FIG. 2B is manufactured by putting two amplitude masks shown in FIG. 2A one upon another, fixing the two amplitude masks on a rotation jig (not shown), and precisely rotating the amplitude masks by $\alpha$ degrees ($\alpha$°) in opposite directions. Reference numeral 306 denotes the direction of an optical fiber or an optical waveguide, reference numerals 308 and 310 denote first and second substrates which have been rotated $\alpha$°, reference numeral 312 is an area through which laser passes, reference character $\Lambda$ denotes the period of the composite amplitude mask, and reference numeral 300 denotes a substrate.

The period ($\Lambda$) of the composite amplitude mask shown in FIG. 2B is determined according to a rotation angle ($\alpha$) by the following Equation 2:

$$\Lambda = \frac{2\Lambda_0 \cos \alpha}{\sin 2\alpha} \quad (2)$$

wherein $\Lambda_0$ denotes the period of the amplitude mask shown in FIG. 2A.

Figure 3A:
FIGS. 3A, 3B, 3C and 3D show the periods of the amplitude masks shown in FIGS. 2A and 2B.
Figure 3B:
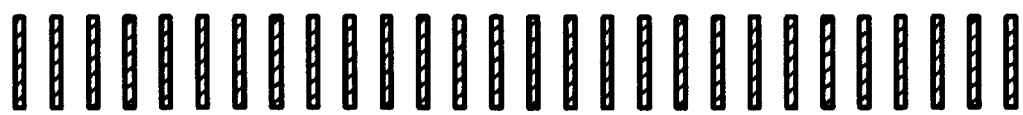
Figure 3C:
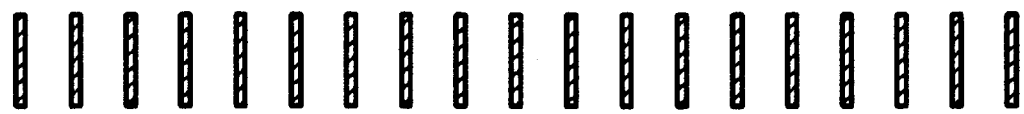
Figure 3D:
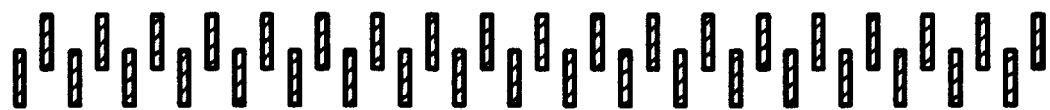

FIGS. 3A, 3B, 3C and 3D show the periods generated when a thermal paper is installed under each amplitude mask and the mask is rotated. FIGS. 3A and 3B show the period of the amplitude mask shown in FIG. 2A, FIG. 3C shows the period of the composite amplitude mask having a rotation angle ($\alpha$) of 45 degrees (45°), and FIG. 3D shows the period when two amplitude masks, each the same as that shown in FIG. 2A, are rotated a° and b°, respectively.

Figure 4:
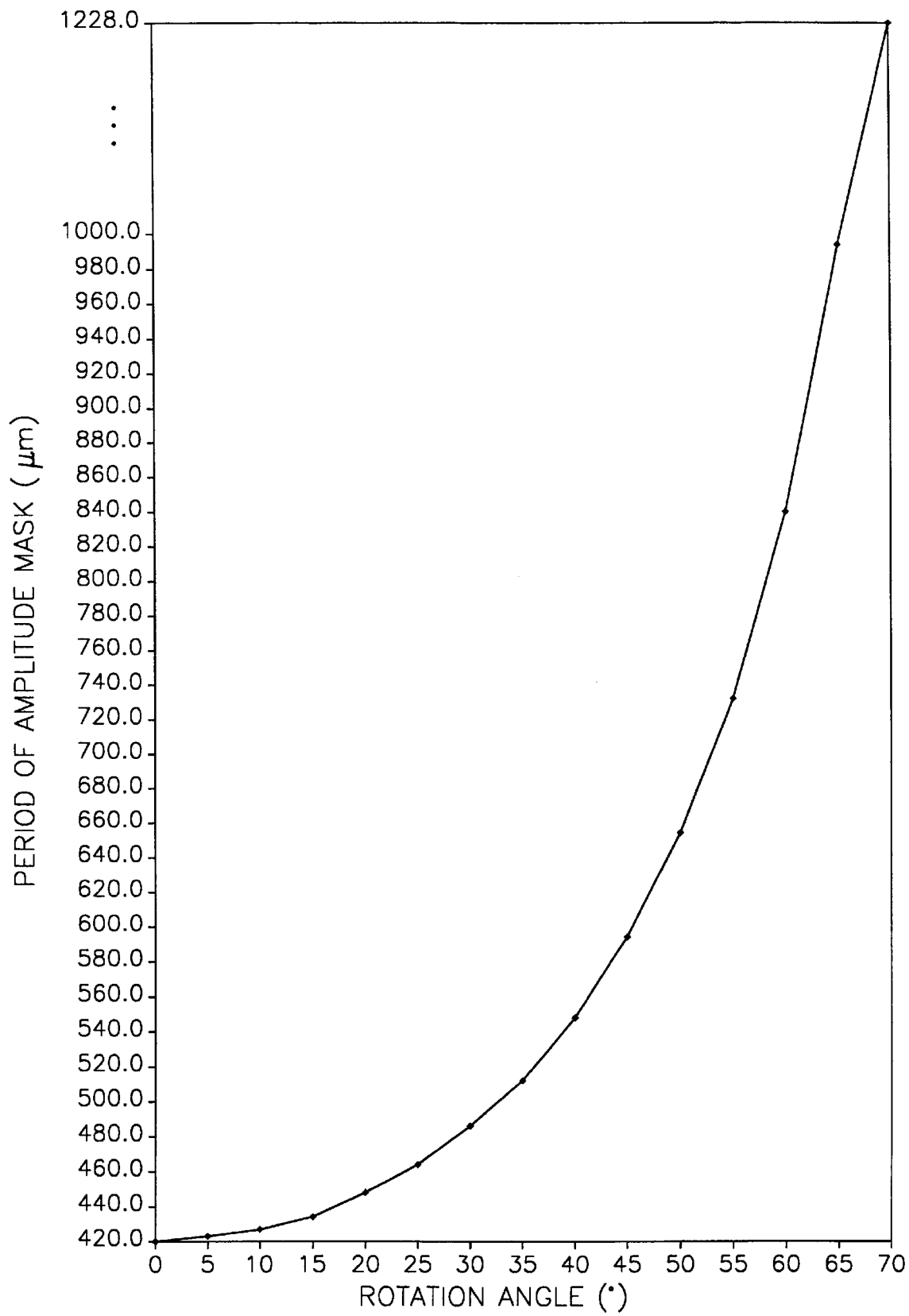
FIG. 4 is a graph showing a variation in the period of a composite amplitude mask according to the rotation angle of the amplitude mask.

FIG. 4 is a graph showing a variation in the period of a composite amplitude mask according to the rotation angle of the amplitude mask. Table 1 shows the rotation angles of the amplitude mask and the periods of the composite amplitude mask depending on the rotation angles. The period of the amplitude mask is 420.0 µm.

TABLE 1

| rotation angle (°) | mask period (µm) |
|---|---|
| 0 | 420.0 |
| 5 | 421.6 |
| 10 | 426.5 |
| 15 | 434.8 |
| 20 | 447.0 |
| 25 | 463.4 |
| 30 | 485.0 |
| 35 | 512/7 |
| 40 | 548.3 |
| 45 | 594.0 |
| 50 | 653.4 |
| 55 | 732.2 |
| 60 | 840.0 |
| 65 | 993.8 |
| 70 | 1228.0 |

Figure 5A:
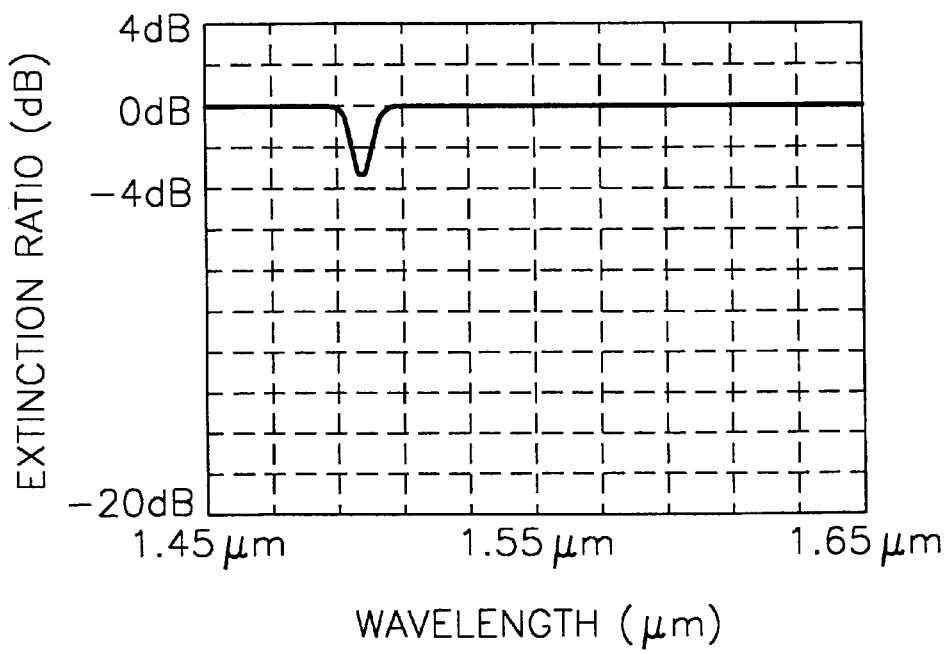
FIGS. 5A and 5B show the light transmission spectrums of a long-period fiber grating when two amplitude masks are rotated zero degrees (0°) and ten degrees (10°), respectively.
Figure 5B:
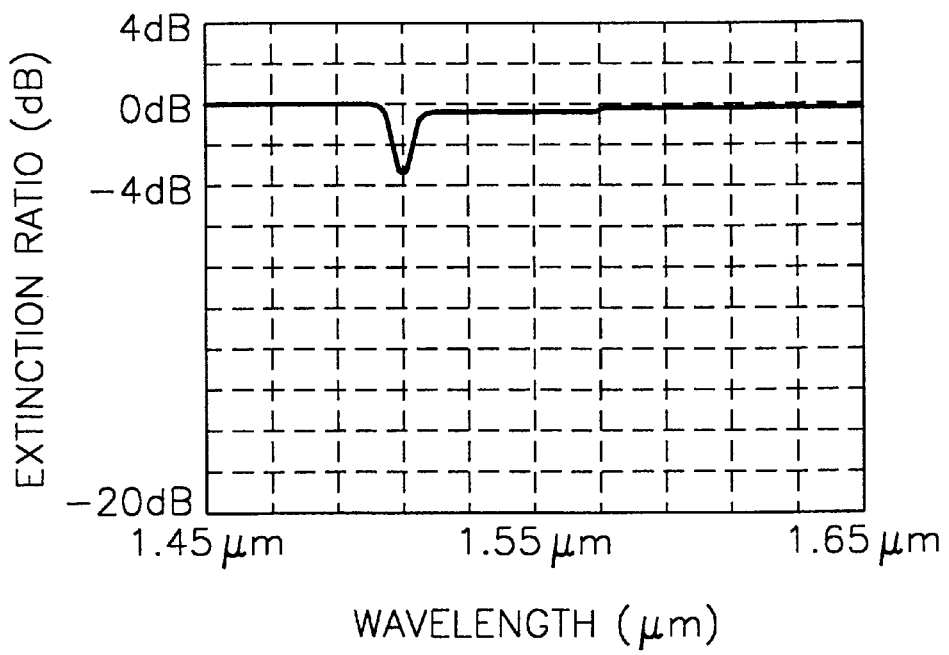

FIGS. 5A and 5B show the light transmission spectrums of long-period fiber gratings having the same extinction ratio when two amplitude masks having periods of 420 µm are rotated 0° and 10°, respectively. The coupling wavelengths of FIGS. 5A and 5B are transmission 1495 nanometers (nm) and 1512 nanometers (nm), respectively.

According to the present invention, the coupling bandwidth of a long-period fiber grating can be controlled by adjusting the size of a laser beam which reaches an optical fiber. The wavelength where coupling occurs is controlled by adjusting the rotation angle of an amplitude mask, so that a desired light transmission spectrum is easily created. Also, the period of the amplitude mask can be adjusted without an expensive apparatus, so that a continuous coupling peak wavelength can be easily obtained compared to the related art in which the period is fixed.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus for manufacturing a long-period fiber grating, comprising:
   a laser unit emitting laser light;
   a first lens adjusting the focal point of the laser light generated by said laser unit;
   a dispersing portion dispersing the laser light passed through said first lens and broadening a beam of the laser light;
   a second lens collimating the dispersed laser light; and
   a composite amplitude mask periodically transmitting to an optical fiber the laser light collimated by said second lens, the optical fiber having a refractive index of a core of the optical fiber periodically changed by the laser light which has passed through said composite amplitude mask.

2. The apparatus of claim 1, further comprising said dispersing portion corresponding to a concave lens.

3. The apparatus of claim 1, further comprising said second lens corresponding to a cylindrical lens having a length corresponding to a length of said long-period fiber grating.

4. The apparatus of claim 1, further comprising said second lens corresponding to a cylindrical lens having a length identical to a length of said long-period fiber grating.

5. The apparatus of claim 1, said apparatus forming a slit having a width being equal to a desired length of said long-period fiber grating, the slit being formed between said second lens and said composite amplitude mask.

6. The apparatus of claim 1, further comprising the laser light corresponding to coherent light of a predetermined wavelength.

7. The apparatus of claim 1, further comprising said composite amplitude mask having a transmission area transmitting the laser light collimated by said second lens and a non-transmission area not transmitting the laser light collimated by said second lens.

8. The apparatus of claim 7, further comprising said composite amplitude mask being adjustable to adjust a period of the transmission area transmitting the laser light collimated by said second lens.

9. The apparatus of claim 1, said composite amplitude mask further comprising two amplitude masks, each of said two amplitude masks having a transmission area transmitting the laser light collimated by said second lens and a non-transmission area not transmitting the laser light collimated by said second lens.

10. The apparatus of claim 9, further comprising each of said two amplitude masks being equally rotated at a same angle in opposite directions to adjust a period of the transmission areas transmitting the laser light collimated by said second lens.

11. The apparatus of claim 10, further comprising said two amplitude masks including metal materials.

12. The apparatus of claim 10, further comprising a rotation jig, said two amplitude masks being mounted on said rotation jig when equally rotated at the same angle in opposite directions.

13. The apparatus of claim 10, further comprising the period of the transmission areas corresponding to a period of said composite amplitude mask.

14. The apparatus of claim 13, further comprising the period ($\Lambda$) of said composite amplitude mask being determined by the following equation:

$$\Lambda = \frac{2\Lambda_0 \cos\theta}{\sin 2\theta}$$

wherein $\Lambda_0$ denotes a period of each of said two amplitude masks and $\theta$ denotes an angle at which said two amplitude masks are equally rotated in opposite directions.

15. An apparatus for manufacturing a long-period fiber grating, comprising:
   a laser source outputting laser light;
   a first lens adjusting a focal point of the laser light output by said laser source;
   a dispersing unit dispersing the laser light passed through said first lens and broadening a beam of the laser light;
   a second lens collimating the dispersed laser light;
   a composite amplitude mask having a transmission area transmitting the laser light collimated by said second lens, said composite amplitude mask transmitting the laser light to an optical fiber in a period of said transmission area;

a measuring unit measuring a coupling peak of said long-period fiber grating formed on the optical fiber by the laser light transmitted through said composite amplitude mask; and a control unit controlling a rotation angle of said composite amplitude mask to cause said measured coupling peak to occur at a desired wavelength.

16. The apparatus of claim 15, said composite amplitude mask further comprising two amplitude masks, the period of said transmission area of said composite amplitude mask being determined by rotating said two amplitude masks by a predetermined angle in opposite directions, each one of said two amplitude masks being formed by alternating transmission areas transmitting the laser light with non-transmission areas not transmitting the laser light.

17. The apparatus of claim 16, further comprising said dispersing unit corresponding to a concave lens.

18. An apparatus, comprising:

a laser unit emitting laser light;

a composite amplitude mask periodically transmitting the laser light to an optical fiber, the optical fiber having a refractive index of a core of the optical fiber periodically changed by the laser light which has passed through said composite amplitude mask; and said composite amplitude mask further comprising two amplitude masks, each of said two amplitude masks having a transmission area transmitting the laser light and a non-transmission area not transmitting the laser light, each of said two amplitude masks being equally rotated at a same angle in opposite directions to adjust a period of said composite amplitude mask.

19. The apparatus of claim 18, further comprising the period ($\Lambda$) of said composite amplitude mask being determined by the following equation:

$$\Lambda = \frac{2\Lambda_0 \cos\theta}{\sin 2\theta}$$

wherein $\Lambda_0$ denotes a period of each of said two amplitude masks and $\theta$ denotes an angle at which said two amplitude masks are equally rotated in opposite directions.

20. The apparatus of claim 19, further comprising:

a dispersing unit dispersing the laser light emitted from said laser unit; and a lens collimating the dispersed laser light, the collimated light output from said lens being conveyed to said composite amplitude mask.

* * * * *